(12) United States Patent
Fujita et al.

(10) Patent No.: US 9,142,228 B2
(45) Date of Patent: Sep. 22, 2015

(54) MAGNETIC RECORDING HEAD HAVING NARROW WRITE GAP, AND DISK DEVICE PROVIDED WITH THE SAME

(71) Applicant: KABUSHIKI KAISHA TOSHIBA, Tokyo (JP)

(72) Inventors: Norihito Fujita, Kanagawa (JP); Satoshi Shirotori, Kanagawa (JP); Shinobu Sugimura, Kanagawa (JP); Tomomi Funayama, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/174,711

(22) Filed: Feb. 6, 2014

(65) Prior Publication Data

US 2015/0092301 A1    Apr. 2, 2015

(30) Foreign Application Priority Data

Oct. 2, 2013  (JP) .................................. 2013-207189

(51) Int. Cl.
*G11B 5/127* (2006.01)
*G11B 5/23* (2006.01)
*G11B 5/31* (2006.01)

(52) U.S. Cl.
CPC ................ *G11B 5/23* (2013.01); *G11B 5/1278* (2013.01); *G11B 5/3146* (2013.01)

(58) Field of Classification Search
CPC ..................... G11B 5/1278; G11B 2005/0024; G11B 5/3146; G11B 2005/0005; G11B 5/3903; G11B 5/39

USPC .................................. 360/125.3, 128, 125.71
See application file for complete search history.

(56) References Cited

U.S. PATENT DOCUMENTS

| 8,107,352 | B1* | 1/2012 | Yamanaka et al. ........ 369/112.27 |
|---|---|---|---|
| 8,164,861 | B2* | 4/2012 | Braganca et al. ............. 360/313 |
| 8,238,058 | B2 | 8/2012 | Shimizu et al. |
| 8,270,112 | B2 | 9/2012 | Funayama et al. |
| 8,320,080 | B1* | 11/2012 | Braganca et al. ............. 360/128 |
| 8,446,691 | B2* | 5/2013 | Takagishi et al. .......... 360/125.3 |
| 8,462,461 | B2* | 6/2013 | Braganca et al. .......... 360/125.3 |
| 8,553,362 | B2* | 10/2013 | Tanabe et al. .............. 360/125.3 |
| 8,564,904 | B2* | 10/2013 | Iwasaki et al. ............. 360/125.3 |
| 8,654,480 | B2* | 2/2014 | Shimizu et al. ............... 360/128 |
| 8,675,308 | B2* | 3/2014 | Yamada et al. ............ 360/125.3 |
| 8,810,946 | B2* | 8/2014 | Yasui et al. ...................... 360/59 |
| 8,810,961 | B2* | 8/2014 | Taguchi et al. .......... 360/123.11 |
| 2009/0052095 | A1* | 2/2009 | Yamada et al. ............... 360/324 |

(Continued)

FOREIGN PATENT DOCUMENTS

JP      2009-099248 A    5/2009

*Primary Examiner* — Brian Miller
(74) *Attorney, Agent, or Firm* — Patterson & Sheridan, LLP (57) ABSTRACT

A recording head of a disk device includes a main magnetic pole, a write shield which faces the main magnetic pole with a write gap interposed therebetween, a coil configured to generate a magnetic field in the main magnetic pole, and a spin torque oscillator which is arranged in the write gap. The spin torque oscillator includes an intermediate layer formed on the main magnetic pole, a field generation layer formed on the intermediate layer, a spin injection layer, and an interface magnetic layer. The field generation layer and the spin injection layer are arranged in parallel to each other in the direction which intersects with the gap length direction of the write gap, and the spin injection layer is electrically connected with the write shield.

20 Claims, 5 Drawing Sheets

(56) References Cited

U.S. PATENT DOCUMENTS

| | | |
|---|---|---|
| 2009/0225465 A1* | 9/2009 | Iwasaki et al. .................. 360/75 |
| 2010/0073806 A1* | 3/2010 | Koui et al. ..................... 360/75 |
| 2011/0038080 A1* | 2/2011 | Alex et al. ................ 360/123.02 |
| 2012/0120518 A1* | 5/2012 | Matsubara et al. ............. 360/55 |
| 2012/0140354 A1* | 6/2012 | Takeo et al. .................... 360/55 |
| 2012/0154952 A1 | 6/2012 | Yamada et al. |
| 2012/0262821 A1* | 10/2012 | Taguchi et al. ............ 360/99.08 |
| 2013/0050875 A1* | 2/2013 | Yamada et al. ............ 360/125.3 |
| 2013/0065086 A1* | 3/2013 | Kudo et al. ................... 428/815 |
| 2013/0069730 A1 | 3/2013 | Yang et al. |
| 2013/0148242 A1* | 6/2013 | Koui et al. ............... 360/125.12 |
| 2013/0335847 A1* | 12/2013 | Shiroishi ........................ 360/46 |

* cited by examiner

MAGNETIC RECORDING HEAD HAVING NARROW WRITE GAP, AND DISK DEVICE PROVIDED WITH THE SAME

CROSS-REFERENCE TO RELATED APPLICATION

This application is based upon and claims the benefit of priority from Japanese Patent Application No. 2013-207189, filed Oct. 2, 2013, the entire contents of which are incorporated herein by reference.

FIELD

Embodiments described herein relate to a magnetic recording head for high frequency assist recording used in a disk device, and a disk device provided with the same.

BACKGROUND

A magnetic disk device includes a magnetic disk arranged in a case, a spindle motor which supports and rotates the magnetic disk, a magnetic head which performs read/write of information on the magnetic disk, and a carriage assembly which movably supports the magnetic head with respect to the magnetic disk. A head portion of the magnetic head includes a magnetic recording head for writing and a reproducing head for reading.

There has been recent proposals for a magnetic head for vertical magnetic recording that enables a magnetic disk device having high recording density or large capacity and miniaturization of the magnetic disk device. In such a magnetic head, the recording head includes a main magnetic pole which generates a magnetic field in the vertical direction, a write shield which is arranged on a trailing side of the main magnetic pole with a write gap sandwiched between the main magnetic pole and the write shield and closes a magnetic path between the main magnetic pole and the magnetic disk, and a coil which supplies a magnetic flux to the main magnetic pole.

There has been also proposed a magnetic recording head for high frequency assist recording where a spin torque oscillator is arranged in the write gap. The spin torque oscillator is formed by laminating a field generation layer, an intermediate layer and a spin injection layer. In addition, the spin torque oscillator, the main magnetic pole and the write shield are electronically connected with each other.

In the magnetic recording head having the above-described configuration, a length of the write gap is defined by the total film thickness of the spin torque oscillator. On the other hand, to increase line recording density, that is, recording resolution in the track longitudinal direction, it is necessary to narrow the write gap. However, in the above-described configuration, it is not possible to make the write gap of the magnetic recording head equal to or smaller than a total film thickness of the spin torque oscillator and hence, it is difficult to increase the line recording density.

DETAILED DESCRIPTION

Embodiments provide a magnetic recording head which enhances recording resolution and enhances line recording density by narrowing a write gap and a magnetic disk device provided with the same.

In general, according to one embodiment, a magnetic recording head includes a main magnetic pole, a write shield which faces the main magnetic pole with a write gap interposed therebetween, a coil configured to generate a magnetic field in the main magnetic pole, and a spin torque oscillator which is arranged in the write gap. The spin torque oscillator includes an intermediate layer formed on the main magnetic pole, a field generation layer formed on the intermediate layer, a spin injection layer, and an interface magnetic layer. The field generation layer and the spin injection layer are arranged in parallel to each other in a direction which intersects with the gap length direction of the write gap, and the spin injection layer is electrically connected with the write shield.

Hereinafter, various embodiments are explained in conjunction with the drawings.

First Embodiment

Figure 1:
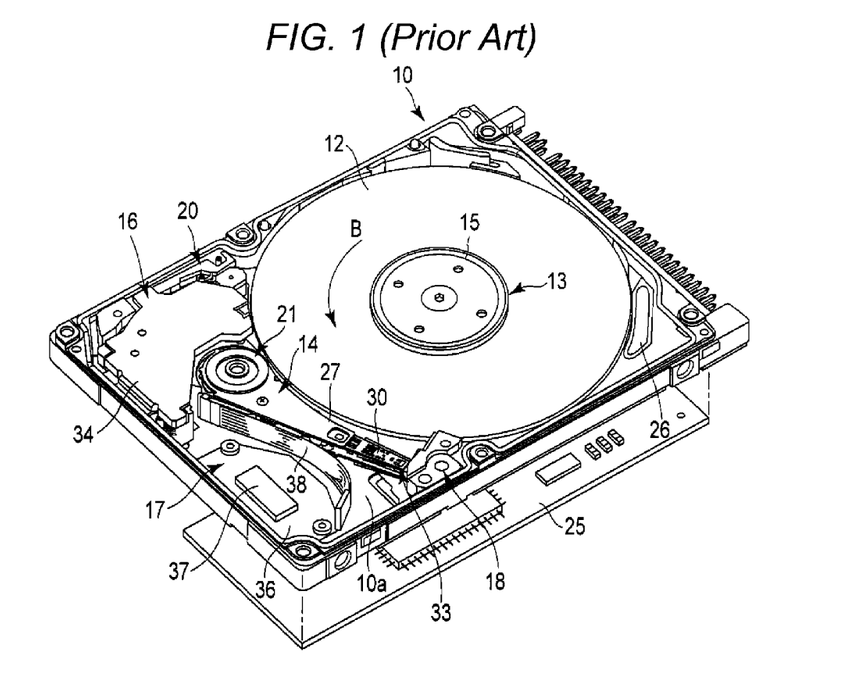
FIG. 1 is a perspective view showing a hard disk drive (HDD) according to a first embodiment.
Figure 2:
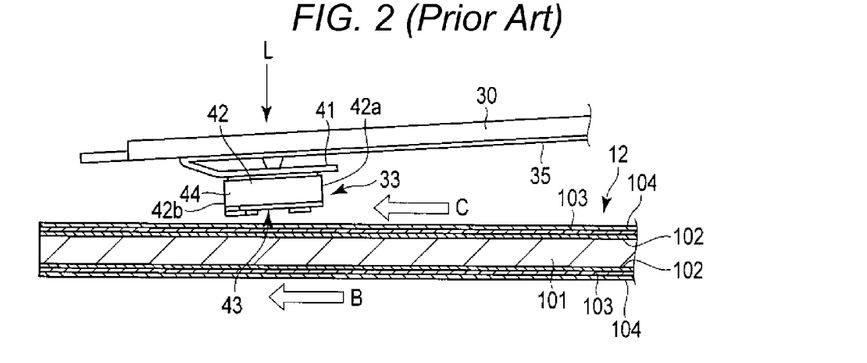
FIG. 2 is a side view showing a magnetic head and a suspension in the HDD.

FIG. 1 shows the inner structure of an HDD of the first embodiment in a state where a top cover is removed. FIG. 2 shows a magnetic head in a floating state. As shown in FIG. 1, the HDD includes a casing 10. The casing 10 includes abase 10a having a rectangular box shape with an open upper surface and a top cover not shown in the drawing having a rectangular plate shape. The top cover is fixed to the base by a plurality of screws so as to close an upper end opening of the base. Due to such a configuration, the casing 10 is kept hermetic and may be ventilated with the exterior only through a breather filter 26.

A magnetic disk 12 which includes a recording medium and a mechanism section are mounted on the base 10a. The mechanism section includes: a spindle motor 13 which supports and rotates the magnetic disk 12; a plurality of (for example, two) magnetic heads 33 which perform recording/reproducing of information to and from the magnetic disk; a head actuator 14 which movably supports the magnetic heads 33 with respect to a surface of the magnetic disk 12; and a voice coil motor (hereinafter referred to as "VCM") 16 which rotates the head actuator and performs the positioning of the head actuator. A ramp load mechanism 18, a latch mechanism 20 and a circuit board unit 17 are mounted on the base 10a. The ramp load mechanism 18 holds the magnetic head 33 at a position spaced apart from the magnetic disk 12 when the magnetic head 33 is moved to the outermost circumference of the magnetic disk 12. The latch mechanism 20 holds the head actuator 14 at a retracted position when an impact or the like is applied to the HDD. Electronic components such as conversion connectors are mounted on the circuit board unit 17.

A control circuit board 25 is fixed to an outer surface of the base 10a by screws and is positioned in a state where the control circuit board 25 faces a bottom wall of the base 10a in an opposed manner. The control circuit board 25 controls the operations of the spindle motor 13, the VCM 16 and the magnetic head 33 via the circuit board unit 17.

As shown in FIG. 1, the magnetic disk 12 is coaxially fitted on a hub of the spindle motor 13 and is clamped by a clamp spring 15 fixed to an upper end of the hub by screws so that the magnetic disk 12 is fixed to the hub. The magnetic disk 12 is rotated by the spindle motor 13 which constitutes a drive motor in the direction indicated by an arrow B at a predetermined speed.

The head actuator 14 includes a bearing portion 21 fixed to the bottom wall of the base 10a and a plurality of arms 27 which extend from the bearing portion 21. These arms 27 are positioned in parallel to the surface of the magnetic disk 12 with a predetermined gap therebetween, and extend in the same direction from the bearing portion 21. The head actuator 14 includes elastically deformable suspensions 30 having an elongated plate shape. Each suspension 30 is formed of a leaf spring, has a proximal end thereof fixed to a distal end of the arm 27 by spot welding or adhesion, and extends from the arm 27. Each suspension 30 may be integrally formed with the corresponding arm 27. The magnetic head 33 is supported on extending ends of the respective suspension 30. The arms 27 and the suspensions 30 constitute a head suspension, and the head suspension and the magnetic head 33 constitute a head suspension assembly.

As shown in FIG. 2, each magnetic head 33 includes: a slider 42 having an approximately rectangular parallelepiped shape; and a head portion 44 for recording and reproducing which is arranged on an outlet (trailing end) of the slider. The magnetic head 33 is fixed to a gimbal spring 41 mounted on a distal end portion of the suspension 30. Due to the resiliency of the suspension 30, a head load L directed toward the surface of the magnetic disk 12 is applied to each magnetic head 33. Two arms 27 are located in parallel to each other with a predetermined gap therebetween, and the suspension 30 and the magnetic head 33 which are mounted on these arms 27 respectively face each other with the magnetic disk 12 interposed therebetween.

Each magnetic head 33 is electrically connected to a main FPC 38 described later via a relay flexible printed circuit board (hereinafter referred to as relay FPC) 35 fixed to the suspension 30 and the arm 27.

As shown in FIG. 1, the circuit board unit 17 includes: an FPC main body 36 formed of a flexible printed circuit board; and a main FPC 38 extending from the FPC main body 36. The FPC main body 36 is fixed to a bottom surface of the base 10a. The electronic components including the conversion connector 37 and a head IC are mounted on the FPC main body 36. An extending end of the main FPC 38 is connected to the head actuator 14, and is connected to the magnetic head 33 via each relay FPC 35.

The VCM 16 includes: a support frame not shown in the drawing which extends from the bearing portion 21 in the direction opposite to the arm 27; and a voice coil which is supported on the support frame. In a state where the head actuator 14 is assembled into the base 10a, the voice coil is positioned between a pair of yokes 34 which is fixed to the base 10a, and constitutes the VCM 16 together with these yokes 34 and magnets fixed to the yokes 34.

When the voice coil of the VCM 16 is energized in a state where the magnetic disk 12 is rotated, the head actuator 14 is rotated, and the magnetic head 33 is moved to and positioned above a desired track of the magnetic disk 12. In such an operation, the magnetic head 33 is moved between an inner peripheral portion and an outer peripheral portion of a magnetic disk along the radial direction of the magnetic disk 12.

Figure 3:
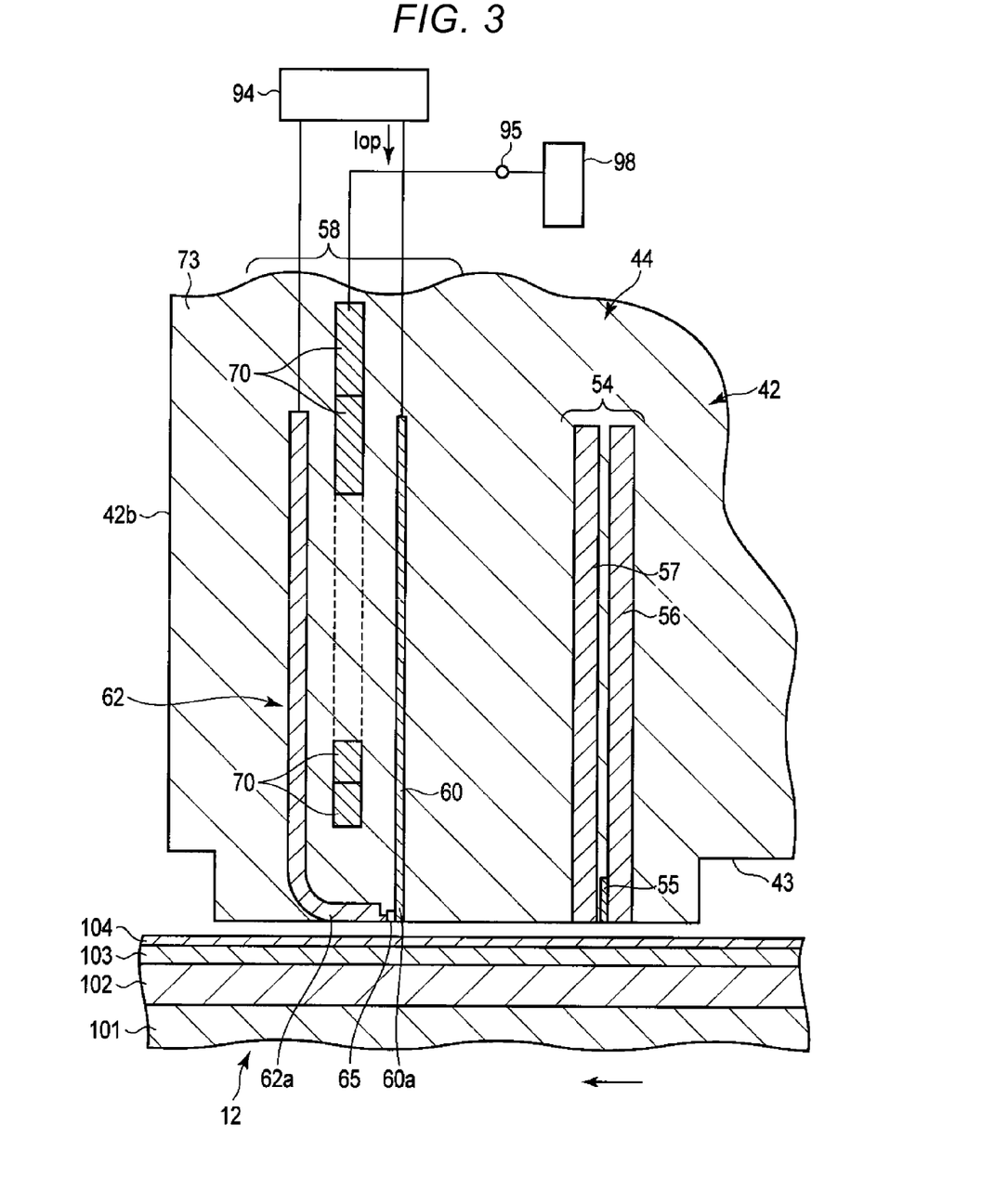
FIG. 3 is an enlarged cross-sectional view showing a head portion of the magnetic head.

Next, the configuration of the magnetic disk 12 and the configuration of the magnetic head 33 are explained in detail. FIG. 3 is an enlarged cross-sectional view showing the head portion 44 of the magnetic head 33 and the magnetic disk 12.

As shown in FIG. 1 to FIG. 3, the magnetic disk 12 includes a substrate 101 which is formed in a disk shape with a diameter of approximately 2.5 inches (6.35 cm), for example, and is made of a non-magnetic material. A soft magnetic layer 102, a magnetic recording layer 103 and a protective film layer 104 are laminated to the respective surface of the substrate 101 in order. The soft magnetic layer 102 forms a background layer and is made of a material having a soft magnetic property. The magnetic recording layer 103 is formed as a layer above the soft magnetic layer 102 and has magnetic anisotropy in the direction perpendicular to the disk surface. The protective film layer 104 is laminated on the magnetic recording layer 103.

As shown in FIG. 2 and FIG. 3, the magnetic head 33 is of a floating type, and includes the slider 42 having an approximately parallelepiped shape, and a head portion 44 formed on an end portion of the slider on an outlet end (trailing) side. The slider 42 is formed of a sintered body of alumina and titanium carbide (AlTiC), for example, and the head portion 44 is formed by laminating thin films.

The slider 42 has a rectangular, disk-facing surface (air-bearing surface (ABS)) 43 which faces the surface of the magnetic disk 12. The slider 42 is floated by an air flow C which is generated between the disk surface and the disk-facing surface 43 due to the rotation of the magnetic disk 12. The direction of the air flow C coincides with the rotational direction B of the magnetic disk 12. The slider 42 is arranged such that the longitudinal direction of the disk-facing surface 43 of the slider 42 approximately coincides with the direction of the air flow C with respect to the surface of the magnetic disk 12.

The slider 42 includes a leading end 42a which is positioned on an inlet side of the air flow C, and a trailing end 42b which is positioned on an outlet side of the air flow C. A leading step, a trailing step, a side step, a negative pressure cavity and the like which are not shown in the drawing are formed on the disk-facing surface 43 of the slider 42.

As shown in FIG. 3, the head portion 44 is formed as a separation type magnetic head and includes a reproducing head 54 and a recording head (magnetic recording head) 58, both of which are formed by a thin film process. The reproducing head 54 and the recording head 58 are covered with a protective insulation film 73 except for a portion of the reproducing head 54 and a portion of the recording head 58 which are exposed at the disk-facing surface 43 of the slider 42. The protective insulation film 73 forms an external shape of the head portion 44.

The reproducing head 54 includes a magnetic film 55 which exhibits a magneto-resistance effect, and shield films 56, 57 which are arranged on a trailing side and a leading side of the magnetic film 55 so as to sandwich the magnetic film 55 therebetween. A lower end of the magnetic film 55 and lower ends of the shield films 56, 57 are exposed on the disk-facing surface 43 of the slider 42.

The recording head 58 is arranged further on a trailing end 42b side of the slider 42 relative to the reproducing head 54.

Figure 4:
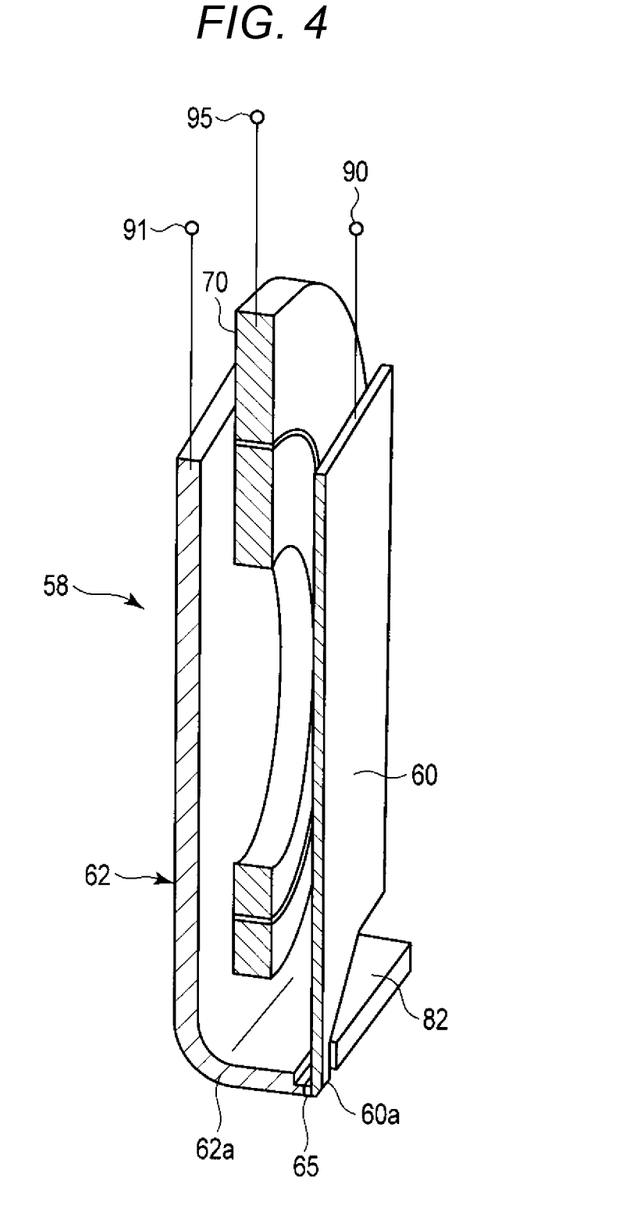
FIG. 4 is a perspective view schematically showing a magnetic recording head of the magnetic head when the magnetic recording head is cut along a track center.
Figure 5:
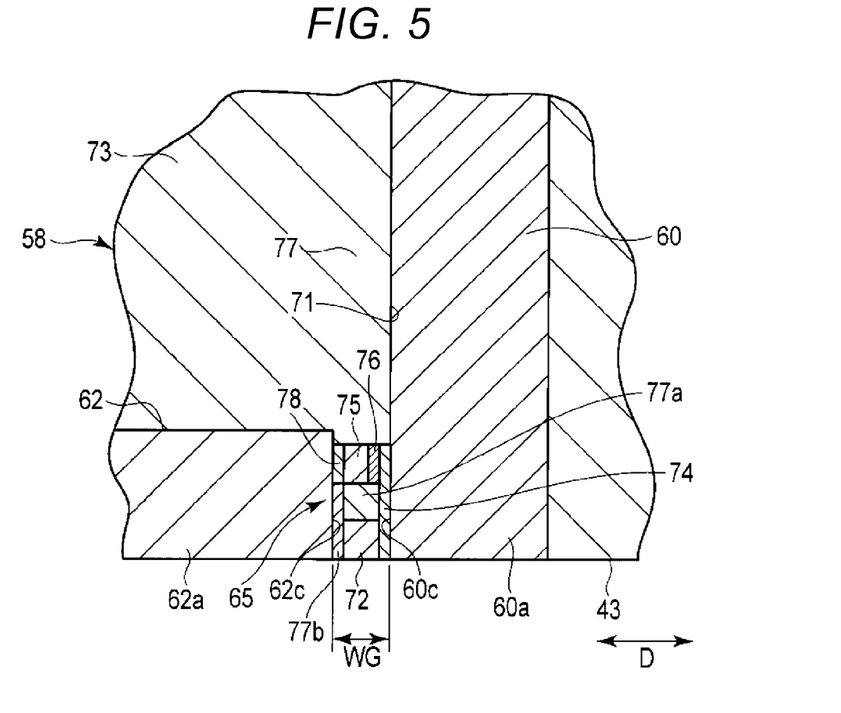
FIG. 5 is a cross-sectional view showing a main magnetic pole, a trailing shield, and a spin torque oscillator of the magnetic recording head.
Figure 6:
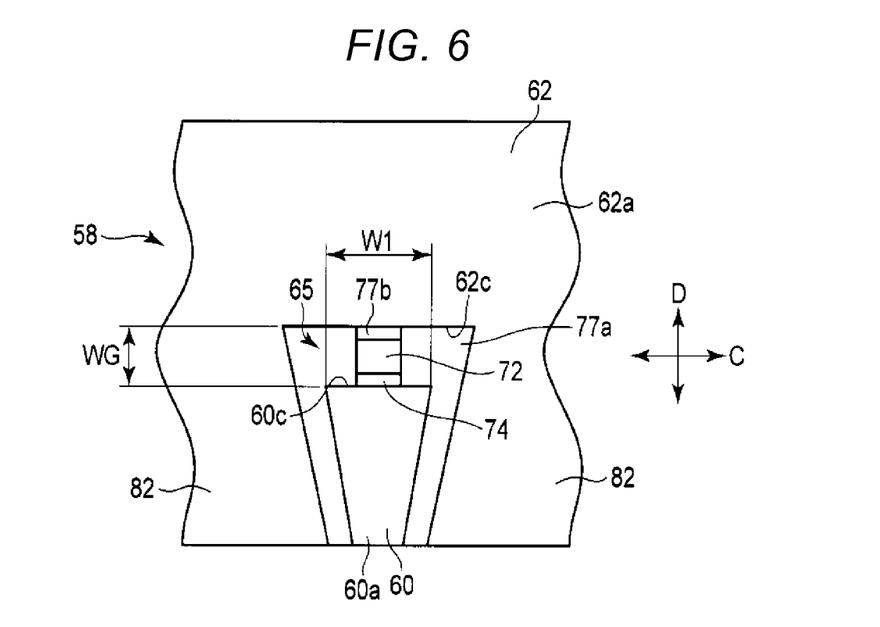
FIG. 6 is a plan view of an area in the vicinity of a write gap of the magnetic recording head as viewed from an air-bearing surface (ABS).

FIG. 4 is a perspective view schematically showing the recording head 58 with a part cut along the track center on the magnetic disk 12. FIG. 5 is an enlarged cross-sectional view showing a main magnetic pole, a trailing shield and a spin torque oscillator of the recording head. FIG. 6 is a plan view of an area of the recording head in the vicinity of a write gap WG as viewed from a disk-facing surface (ABS) side.

As shown in FIG. 3 and FIG. 4, the recording head 58 includes: a main magnetic pole 60 which is made of a soft magnetic material having a high saturation magnetic flux density; a trailing shield (write shield) 62 which is arranged on a trailing side of the main magnetic pole 60 and is made of a soft magnetic material having a high saturation magnetic flux density; a recording coil 70 which is arranged so as to wrap around a magnetic circuit, which includes the main magnetic pole 60 and the trailing shield 62, for supplying a magnetic flux to the main magnetic pole 60; and a high frequency oscillation element such as a spin torque oscillator 65, for example, which is arranged between a distal end portion 60a of the main magnetic pole 60 and the trailing shield 62 and at a portion which faces the ABS 43. For magnetizing a magnetic recording layer 103 of the magnetic disk 12, the main magnetic pole 60 generates a recording magnetic field in the direction perpendicular to the surface of the magnetic disk 12. The trailing shield 62 is provided for efficiently closing a magnetic path via the soft magnetic layer 102 arranged directly below the main magnetic pole 60.

As shown in FIG. 3 to FIG. 6, the main magnetic pole 60 extends in the direction substantially perpendicular to the surface of the magnetic disk 12 and the ABS 43. A distal end portion 60a of the main magnetic pole 60 on a magnetic disk 12 side is tapered toward the ABS 43 so that distal end portion 60a is formed into a columnar shape having a narrow width compared to other portions of the main magnetic pole 60. A distal end surface of the main magnetic pole 60 is exposed on the ABS 43 of the slider 42. A width W1 of the distal end portion 60a of the main magnetic pole 60 in the cross track direction (track width direction) C substantially corresponds to a width of a track of the magnetic disk 12.

The trailing shield 62 is formed into approximately an L shape, and has a distal end portion 62a which faces the distal end portion 60a of the main magnetic pole 60 in an opposed manner. The distal end portion 62a of the trailing shield 62 is formed into an elongated rectangular shape. A distal end surface of the trailing shield 62 is exposed on the ABS 43 of the slider 42. A leading side end surface 62c of the distal end portion 62a extends along a width direction of the track of the magnetic disk 12. The leading side end surface 62c is parallel to and faces a trailing side end surface 60c of the main magnetic pole 60 with a write gap WG (a gap length in the down track direction D) interposed therebetween.

In this embodiment, the recording head 58 includes side shields 82 which are physically separated from the main magnetic pole 60 on both sides of the main magnetic pole 60 in the width direction of the track and are arranged so as to be connected to the trailing shield 62 respectively. In this embodiment, the side shields 82 are integrally formed with the trailing shield 62.

The recording coil 70 is arranged between the main magnetic pole 60 and the trailing shield 62, for example. A terminal 95 is connected to the recording coil 70, and a power source 98 is connected to the terminal 95. An electric current which is supplied to the recording coil 70 from the power source 98 is controlled by a control unit of the HDD. In writing a signal to the magnetic disk 12, a predetermined electric current is supplied to the recording coil 70 from the power source 98 so that a magnetic flux flows through the main magnetic pole 60 thus generating a magnetic field.

As shown in FIG. 5 and FIG. 6, the spin torque oscillator 65 is arranged between the distal end portion 60a of the main magnetic pole 60 and the leading side end surface 62c of the trailing shield 62 and in the write gap WG. The main magnetic pole 60 is made of an alloy which contains Fe, Co, Ni or the like, and is formed by a plating method or a sputtering method. The trailing side end surface 60c of the main magnetic pole 60 is levelled by Chemical-Mechanical-Polishing (CMP), and a spin torque oscillator 65 is formed on the trailing side end surface 60c.

The spin torque oscillator 65 includes: a field generation layer 72; an intermediate layer 74; a spin injection layer 75; and an interface magnetic layer 76. The intermediate layer 74 is formed on the trailing side end surface 60c of the main magnetic pole 60, and a lower end portion of the intermediate layer 74 is exposed on the ABS 43. The field generation layer 72 and the interface magnetic layer 76 are laminated on the intermediate layer 74, and the spin injection layer 75 is formed on the interface magnetic layer 76. Due to this configuration, the field generation layer 72 and the interface magnetic layer 76 as well as the field generation layer 72 and the spin injection layer 75 are arranged to be parallel to each other in the direction which intersects with the gap length direction (down track direction D) of the write gap WG, for example, in the direction orthogonal to the gap length direction of the write gap WG (in the direction perpendicular to the ABS 43). That is, the field generation layer 72, the interface magnetic layer 76, and the spin injection layer 75 are arranged on the same plane which is parallel to the intermediate layer 74.

A lower end of the field generation layer 72 is exposed on the ABS 43 and is positioned on the same plane as the ABS. An insulation layer 77a is formed between the field generation layer 72 and the interface magnetic layer 76 and the spin injection layer 75. An electrode layer 78 is formed between the spin injection layer 75 and the trailing shield 62. Due to this configuration, the spin injection layer 75 is electrically connected to the trailing shield 62 via the electrode layer 78, and is electrically connected to the main magnetic pole 60 via the interface magnetic layer 76 and the intermediate layer 74.

An insulation layer 77b is formed between the field generation layer 72 and the trailing shield 62 as well as between the insulation layer 77a and the trailing shield 62. Thus, in this configuration, the field generation layer 72 is surrounded by the insulation layers 77a, 77b so that the field generation layer 72 is electrically insulated from the trailing shield 62.

In this embodiment, respective widths in the cross track direction C of the field generation layer 72, the intermediate layer 74, the spin injection layer 75, the interface magnetic layer 76, the electrode layer 78, and the insulation layer 77a are set smaller than the width W1 of the write gap WG in the cross track direction C. The widths of the respective layers may be set equal the width W1 or may be set larger than the width W1.

The intermediate layer 74 formed on the main magnetic pole 60 is made of a non-magnetic material. Since the intermediate layer 74 plays a role of supplying a spin current from the spin injection layer 75 to the field generation layer 72, it is preferable that the intermediate layer 74 is made of a material having a long spin diffusion length. For example, a material such as Cu, Ag or Au may be used for forming the intermediate layer 74. For example, a spin diffusion length of Cu which is a non-magnetic conductor is approximately 700 nm at a room temperature. On the other hand, a spin diffusion length of a ferromagnetic material is several nm to several tens nm, that is short compared to the spin diffusion length of Cu. By forming the intermediate layer 74 using a material having a long spin diffusion length, it is possible to elongate the intermediate layer 74 in the stripe height direction within a range shorter than the spin diffusion length.

The field generation layer 72 may be formed using a soft magnetic layer made of CoFe, CoNiFe, NiFe, CoZrNb, FeN, FeSi, FeAlSi, FeCoAl, FeCoSi, CoFeB or the like besides FeCoAl which has a relatively large saturation magnetic flux density and has magnetic anisotropy in an in-plane direction, or a CoCr-based magnetic alloy film made of CoIr or the like where the magnetization is oriented in the in-plane direction. As a material for forming the field generation layer 72, for adjusting the saturated magnetization and an anisotropic magnetic field, a lamination film which is formed by laminating a plurality of materials described above may be also used. A film which is made of a high Bs soft magnetic material (FeCo/Ni lamination film) and has a thickness of 5 to 20 nm may be used for forming the field generation layer 72, for example.

For forming the interface magnetic layer 76, an alloy which contains at least one element out of Fe, Co and Ni, and at least one element selected from a group consisting of Cr, V, Mn, Ti and Sc is used. A concentration of one element selected from a group consisting of Cr, V, Mn, Ti and Sc may be determined by the following conditions. A minimum element concentration is a concentration at which the field generation layer is oscillated with the energization in the direction opposite to the energization of a material for forming the conventional spin injection layer. A maximum element concentration is a concentration at which the magnetization does not disappear.

For forming the spin injection layer 75, a perpendicular magnetic film made of a material represented by a CoCr-based alloy such as CoCrPt, CoCrTa, CoCrTaPt or CoCrTaNb, an RE-TM-based amorphous alloy such as TbFeCo, an artificial lattice such as FeCo/Ni, CoFe/Ni, Co/Ni, Co/Pt, Co/Pd, or Fe/Pt, an FePt-based alloy, a CoPt-based alloy, and a SmCo-based alloy, may be used.

As a material for forming the insulation layers 77a, 77b which cover the field generation layer 72, an Si oxide, an Si nitride, an Al oxide, or an Al nitride may be used and, for example, SiOx is used. The electrode layer 78 is formed on the spin injection layer 75. The trailing shield 62 is formed on the insulation layers 77a, 77b. The trailing shield 62 is made of an alloy of Fe, Co, Ni or the like, and is formed by a plating method or a sputtering method.

As shown in FIG. 3 and FIG. 4, an electric current circuit is configured such that the power source 94 is connected to the main magnetic pole 60 and the trailing shield 62, and an electric current is energized in series from the power source 94 via the main magnetic pole 60, the spin torque oscillator 65, the electrode layer 78, and the trailing shield 62.

When the spin torque oscillator 65 is energized via the main magnetic pole 60, the intermediate layer 74, the interface magnetic layer 76, the spin injection layer 75, the electrode layer 78, and the trailing shield 62, spin electrons which are polarized by the interface magnetic layer 76 and the spin injection layer 75, are accumulated in the intermediate layer 74. The polarized spin electrons which are accumulated in intermediate layer 74 enter the field generation layer 72 which is in contact with the intermediate layer 74 and hence, the magnetization of the field generation layer 72 starts precession movement thus generating a high frequency magnetic field.

In writing data to a magnetic disk (recording medium), to enhance the assisting effect of a high frequency magnetic field, it is desirable to generate a larger intensity high frequency magnetic field. However, to increase the intensity of a high frequency magnetic field, it is necessary to increase a magnetic film thickness of the field generation layer 72, that is, the product of a magnitude of magnetization and a film thickness. It has been known that the magnitude of magnetization has an upper limit so that it is necessary to increase a film thickness of the field generation layer 72 to increase the magnetic film thickness. However, in the conventional magnetic recording head where a field generation layer, an intermediate layer and a spin injection layer are formed in a write gap in a laminated manner, when a film thickness of the field generation layer is increased so as to increase the intensity of the high frequency magnetic field, a gap length is also increased along with the increase of the film thickness so that a favorable linear recording density is difficult to obtain.

To the contrary, according to this embodiment, the field generation layer 72 and the spin injection layer 75 are formed in the write gap WG such that the field generation layer 72 and the spin injection layer 75 are arranged to be parallel with each other, that is, the field generation layer 72 and the spin injection layer 75 are arranged to be parallel with each other in the direction which intersects with the down track direction of the write gap WG. Accordingly, even when a film thickness of the field generation layer 72 is increased to some extent, a relatively narrow gap length of the write gap WG still may be maintained. Accordingly, even when the field generation layer has the same film thickness as the prior art, it is possible to acquire a sufficient line recording density by decreasing a gap length of the write gap WG. Further, the field generation layer 72 is not electrically connected to the trailing shield 62 so that an electric current does not flow in the field generation layer 72 so that the generation of Joule heat may be suppressed. Accordingly, the deterioration of oscillation in the field generation layer due to thermal disturbance may be suppressed so that the reliability of the recording head as an oscillation element may be enhanced. Further, the field generation layer 72 which generates a high frequency magnetic field is exposed on the ABS 43 and is formed at a portion close to the magnetic disk and hence, an intensity of the high frequency magnetic field which acts on the magnetic disk may be enhanced.

In the HDD having the above-mentioned configuration, when the VCM 16 is driven, the head actuator 14 is rotated, and the magnetic head 33 is moved to a desired track of the magnetic disk 12 and is positioned. The magnetic head 33 is floated by an air flow C which is generated between the disk surface and the ABS 43 due to the rotation of the magnetic disk 12. When the HDD is operated, the ABS 43 of the slider 42 faces the disk surface while maintaining a gap therebetween. As shown in FIG. 2, the magnetic head 33 is floated with an inclination posture where the recording head 58 of the head portion 44 comes closest to the surface of the magnetic disk 12. In such a state, reading of recording information from the magnetic disk 12 is performed by the reproducing head 54, and writing of information to the magnetic disk 12 is performed by the recording head 58.

In writing information, as shown in FIG. 3, a DC current is supplied to the main magnetic pole 60, the intermediate layer 74, the interface magnetic layer 76, the spin injection layer 75, the electrode layer 78, and the trailing shield 62 from the power source 94 to thereby generate a high frequency magnetic field from the spin torque oscillator 65, and the high frequency magnetic field is applied to the magnetic recording layer 103 of the magnetic disk 12. By making an AC current flow to the recording coil 70 from the power source 98, the main magnetic pole 60 is excited by the recording coil 70, and a recording magnetic field in the vertical direction is applied to the magnetic recording layer 103 which is arranged directly below the main magnetic pole 60 from the main magnetic pole 60. With this configuration, information is recorded in the magnetic recording layer 103 with a desired track width. By superposing a high frequency magnetic field on a recording magnetic field, it is possible to perform magnetic recording with a high magnetic coercive force and a high magnetic anisotropic energy.

As has been explained above, according to the first embodiment, it is possible to provide a magnetic recording head which enhances recording resolution and enhances line recording density by narrowing the write gap WG and the magnetic disk device provided with the magnetic recording head.

Figure 7:
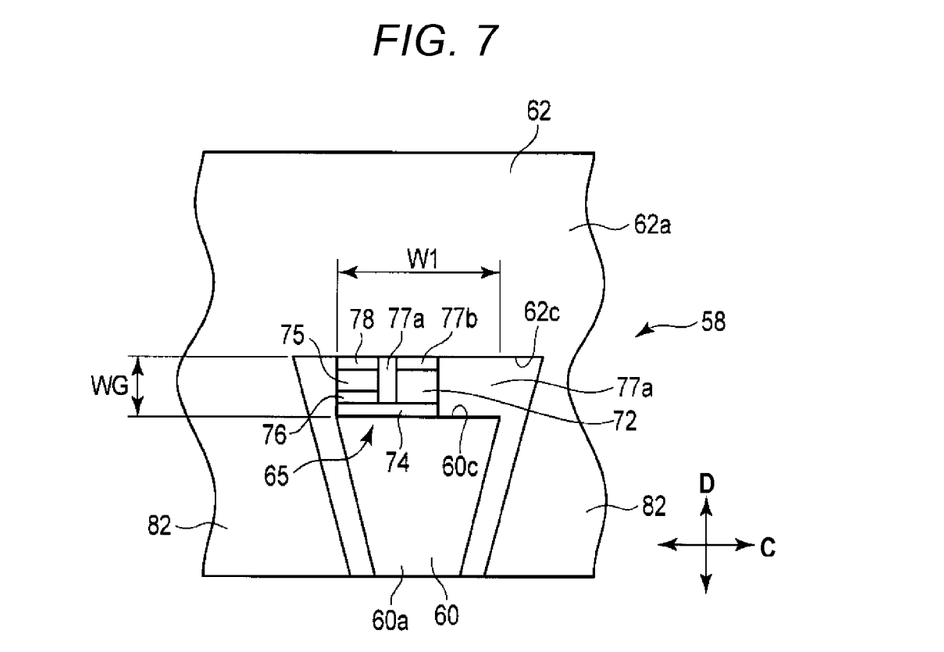
FIG. 7 is a plan view of a magnetic recording head of an HDD according to a second embodiment as viewed from the ABS.

Next, magnetic recording heads of an HDD according to other embodiments are explained. In other embodiments explained hereinafter, parts identical with the parts of the first embodiment explained previously are given same symbols and the detailed explanation of these parts is omitted, and parts which make these embodiments different from the first embodiment are mainly explained in detail Second Embodiment FIG. 7 is a plan view of a distal end portion of a magnetic recording head of an HDD according to the second embodiment as viewed from an ABS side.

According to the second embodiment, a spin torque oscillator 65 is formed in a write gap WG between a distal end portion 60a of a main magnetic pole 60 and a leading side end surface 62c of a trailing shield 62. A write shield includes a side shield 82 which is integrally formed with the trailing shield 62.

The spin torque oscillator 65 includes: a field generation layer 72; an intermediate layer 74; a spin injection layer 75; and an interface magnetic layer 76. The intermediate layer 74 is formed on a trailing side end surface 60c of the main magnetic pole 60, and a lower end portion of the intermediate layer 74 is exposed on an ABS 43. The field generation layer 72 and the interface magnetic layer 76 are laminated on the intermediate layer 74, and the spin injection layer 75 is formed on the interface magnetic layer. Due to this configuration, the field generation layer 72, the interface magnetic layer 76 and the spin injection layer 75 are arranged to be parallel with each other in the direction which intersects with the gap length direction (down track direction D) of the write gap WG, for example, in the cross track direction C (the direction parallel to the ABS 43). That is, the field generation layer 72, the interface magnetic layer 76 and the spin injection layer 75 are arranged on the same plane which is parallel to the intermediate layer 74.

A lower end of the field generation layer 72 and a lower end of the spin injection layer 75 are exposed on the ABS 43, and are positioned on the same plane as the ABS. An insulation layer 77b is formed between the field generation layer 72 and a leading side end surface 62c of a trailing shield 62. An electrode layer 78 is formed between the spin injection layer 75 and the leading side end surface 62c of the trailing shield 62. Due to this constitution, the spin injection layer 75 is electrically connected to the trailing shield 62 via the electrode layer 78, and is electrically connected to the main magnetic pole 60 via the interface magnetic layer 76 and the intermediate layer 74.

A gap formed between the field generation layer 72 and the spin injection layer 75 and peripheries of these layers are filled with an insulation layer made of AlTiC or the like. Due to this configuration, the field generation layer 72 is electrically insulated from the trailing shield 62.

In this manner, the field generation layer 72 and the spin injection layer 75 which are formed on the intermediate layer 74 are arranged to be parallel with each other in the cross-track direction C orthogonal to the down track direction D of the write gap WG, and is arranged on the same plane which intersects with the write gap WG. The field generation layer 72 is positioned approximately at a center portion of the main magnetic pole 60 in the cross track direction C, the spin injection layer 75 is arranged on a side closer to a side shield 82 relative to the field generation layer 72, and is positioned on an end portion of the main magnetic pole 60 in the cross track direction C.

In the second embodiment, configurations of the recording head 58 other than the above-mentioned configurations are the same as the corresponding configurations of recording head according to the first embodiment described previously.

According to the above-mentioned configuration, even when a film thickness of the field generation layer 72 is increased to some extent, a relatively narrow write gap length still may be maintained. Accordingly, even when the field generation layer has the same film thickness as the prior art, it is possible to acquire a sufficient line recording density by reducing a write gap length. Further, an electric current does not flow in the field generation layer 72 and hence, the generation of Joule heat may be suppressed. Accordingly, the deterioration of oscillation due to thermal disturbance may be suppressed so that the reliability of the recording head as an element may be enhanced.

Also in the second embodiment, it is possible to provide the magnetic recording head which enhances recording resolution and line recording density by narrowing a write gap WG and a magnetic disk device provided with the magnetic recording head.

Third Embodiment

Figure 8:
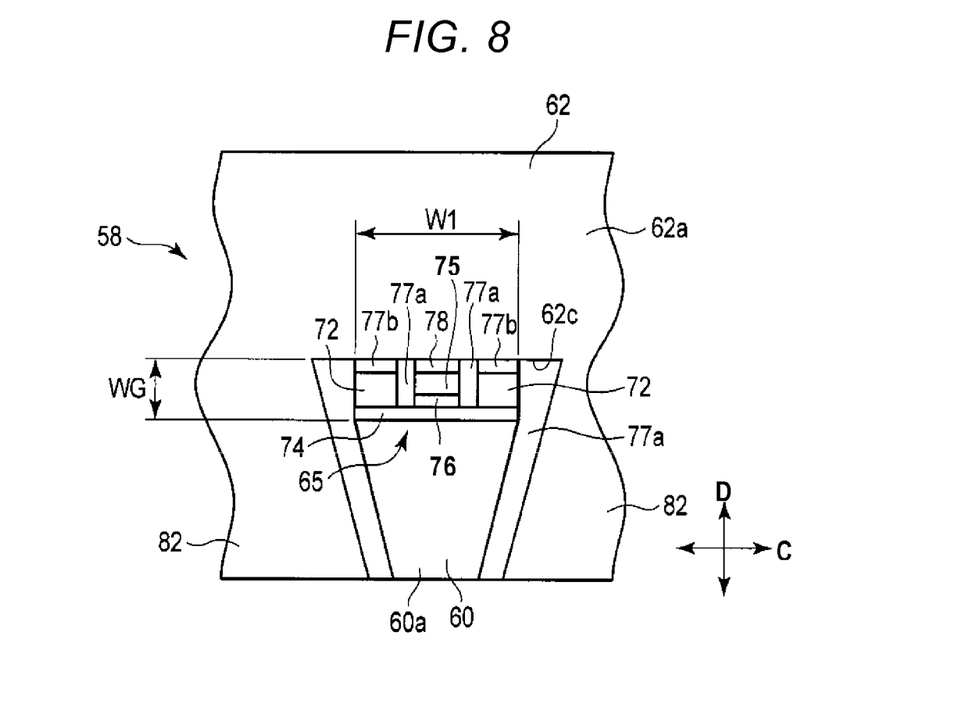
FIG. 8 is a plan view of a magnetic recording head of an HDD according to a third embodiment as viewed from the ABS.

FIG. 8 is a plan view of a magnetic recording head according to the third embodiment as viewed from an ABS side. A recording head 58 of an HDD of this embodiment is a recording head which is preferably applicable to a magnetic recording head adopting a single recording system.

As shown in FIG. 8, a spin torque oscillator 65 is formed in a write gap WG between a distal end portion 60a of a main magnetic pole 60 and a leading side end surface 62c of a trailing shield 62. A write shield includes a side shield 82 which is integrally formed with the trailing shield 62.

A spin torque oscillator 65 includes: a field generation layer 72; an intermediate layer 74; a spin injection layer 75; and an interface magnetic layer 76. The intermediate layer 74 made of a non-magnetic material is formed on a trailing side end surface 60c of the main magnetic pole 60, and a lower end portion of the intermediate layer 74 is exposed on an ABS 43. Two field generation layers 72 and the interface magnetic layer 76 are laminated on the intermediate layer 74, and the spin injection layer 75 is formed on the interface magnetic layer 76. The spin injection layer 75 is formed on the center of the main magnetic pole 60 in the cross track direction C, and two field generation layers 72 are formed on both sides of the spin injection layer, that is, on both end portions of the main magnetic pole 60 in the cross track direction C respectively. Due to this configuration, two field generation layers 72 and the spin injection layer 75 are arranged to be parallel with each other in the cross track direction C orthogonal to the down track direction D of the write gap WG, and are arranged to be parallel with each other on the same plane which intersects with the write gap WG. A lower ends of two field generation layers 72 and a lower end of the spin injection layer 75 are exposed on the ABS, and are made coplanar with the ABS.

An electrode layer 78 is formed between the spin injection layer 75 and the trailing shield 62, and an insulation layer 77*b* is formed between each oscillation field generation layer 72 and the trailing shield 62. The periphery of each oscillation field generation layer 72 is surrounded by an insulation layer 77*a* so that the oscillation field generation layer is electrically insulated from a write shield (trailing shield, side shield). In the third embodiment, configurations of the recording head 58 other than the above-mentioned configurations are the same as the corresponding configurations of the recording head of the first embodiment described previously.

A single recording system is a system for forming a thin track by overwriting data on a magnetic disk by slightly and gradually displacing a recording head. According to this embodiment, by slightly displacing the recording head such that, on a portion where data is to be stored on a side where the field generation layer 72 is formed, a high frequency magnetic field acts on the formed thin track portion so that desired single recording may be performed. According to this embodiment, the field generation layer 72 is formed on both ends of the main magnetic pole and hence, in performing the single recording, it is possible to use two field generation layers for different applications between an inner peripheral side and an outer peripheral side of the magnetic recording medium.

In addition to the above-mentioned configuration, also in this embodiment, it is possible to provide the magnetic recording head which enhances recording resolution and line recording density by narrowing a write gap WG and the magnetic disk device provided with the magnetic recording head.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, material, shape, sizes or the like of elements which constitute the head portion may be changed when necessary. In the magnetic disk device, the number of magnetic disks and the number of magnetic heads may be increased when necessary, and a size of the magnetic disk may be variously selected.

What is claimed is:

1. A magnetic recording head comprising:
    a main magnetic pole;
    a write shield which faces the main magnetic pole with a write gap interposed there between;
    a coil configured to generate a magnetic field in the main magnetic pole; and
    a spin torque oscillator arranged in the write gap, the spin torque oscillator including an intermediate layer formed on the main magnetic pole, a field generation layer formed on the intermediate layer, a spin injection layer, and an interface magnetic layer, wherein
    the field generation layer and the spin injection layer are arranged in parallel to each other in a direction which intersects with a gap length direction of the write gap, either in a direction crossing the gap length direction of the write gap or in a cross track direction, and
    the spin injection layer is electrically connected with the write shield via an electrode layer that is between the spin injection layer and the write shield.

2. The magnetic recording head according to claim 1, wherein the magnetic recording head has a recording medium facing surface, and the spin torque oscillator is exposed at the recording medium facing surface.

3. The magnetic recording head according to claim 2, wherein the field generation layer and the spin injection layer are arranged on a same plane that is orthogonal to the gap length direction of the write gap.

4. The magnetic recording head according to claim 3, wherein the field generation layer is arranged closer to the recording medium facing surface than the spin injection layer.

5. The magnetic recording head according to claim 3, wherein both the field generation layer and the spin injection layer are exposed at the recording medium facing surface.

6. The magnetic recording head according to claim 5, wherein the field generation layer and spin injection layer of the spin torque oscillator are arranged along a cross track direction of the recording medium and an insulating layer is interposed there between.

7. The magnetic recording head according to claim 6, wherein the spin injection layer is formed at a center portion of the main magnetic pole in the cross track direction.

8. The magnetic recording head according to claim 7, wherein field generation layers are formed at either side of the spin injection layer with corresponding insulating layers interposed between the field generation layers and the spin injection layer.

9. The magnetic recording head according to claim 6, wherein the spin injection layer is formed at an end portion of the main magnetic pole in the cross track direction.

10. The magnetic recording head according to claim 1, further comprising:
    side shields located on both sides of the main magnetic pole in the cross track direction with a gap formed there between.

11. The magnetic recording head according to claim 1, wherein the interface magnetic layer is formed between the intermediate layer and the spin injection layer, and the spin injection layer is bonded to the write shield with a magnetic pole layer interposed there between.

12. The magnetic recording head according to claim 1, further comprising:
    an insulation layer formed between the field generation layer and the write shield; and
    an insulation layer formed between the field generation layer and the spin injection layer.

13. A disk device comprising:
    a recording medium including a magnetic recording layer;
    a drive mechanism configured to rotate the recording medium; and
    a magnetic recording head including a main magnetic pole, a write shield which faces the main magnetic pole with a write gap interposed there between, a coil configured to generate a magnetic field in the main magnetic pole, and a spin torque oscillator arranged in the write gap, the spin torque oscillator including an intermediate layer formed on the main magnetic pole, a field generation layer formed on the intermediate layer, a spin injection layer, an electrode layer, and an interface magnetic layer, wherein
    the field generation layer and the spin injection layer are arranged in parallel to each other in a direction which intersects with a gap length direction of the write gap, either in a direction crossing the gap length direction of the write gap or in a cross track direction, and the spin injection layer is electrically connected with the write shield via the electrode layer that is between the spin injection layer and the write shield.

14. The disk device according to claim 13, wherein the disk device has a recording medium facing surface, and the spin torque oscillator is exposed at the recording medium facing surface.

15. The disk device according to claim 14, wherein the field generation layer and the spin injection layer are arranged on a same plane that is orthogonal to the gap length direction of the write gap.

16. The disk device according to claim 15, wherein the field generation layer is arranged closer to the recording medium facing surface than the spin injection layer.

17. The disk device according to claim 15, wherein both the field generation layer and the spin injection layer are exposed at the recording medium facing surface, and the spin injection layer is formed at a center portion of the main magnetic pole in the cross track direction with field generation layers formed at either side of the spin injection layer with corresponding insulating layers interposed between the field generation layers and the spin injection layer.

18. The disk device according to claim 15, wherein both the field generation layer and the spin injection layer are exposed at the recording medium facing surface, and the spin injection layer is formed at an end portion of the main magnetic pole in the cross track direction.

19. The disk device according to claim 13, further comprising:

side shields located on both sides of the main magnetic pole in the cross track direction with a gap formed there between.

20. The disk device according to claim 13, wherein the interface magnetic layer is formed between the intermediate layer and the spin injection layer, and the spin injection layer is bonded to the write shield with a magnetic pole layer interposed there between.

* * * * *